INVENTOR
C. S. LIVERMORE
BY
ATTORNEY

UNITED STATES PATENT OFFICE 2,398,432

MEANS FOR DETECTING SUBMARINE MINES

Clifford S. Livermore, Washington, D. C.

Application April 9, 1942, Serial No. 438,319

14 Claims. (Cl. 177—386)

(Granted under the act of March 3, 1883, as amended April 30, 1928; 370 O. G. 757)

This invention relates to devices for detecting the presence of submarine mines which have been surreptitiously planted within a body of water. More specifically, the invention relates to a system for detecting and recording the number of mines planted within the body of water in which the recorded information includes the time of planting of each of the mines and the location thereof with reference to the detecting means.

As is well known, it is the practice in a country at war to plant mines within harbors, rivers, canals and along the coast of the belligerent country. This is usually done surreptitiously at night and in a manner calculated to convey as little information as possible to the enemy regarding the whereabouts of the planted mines and the times during which the mines are planted.

In the system of the present invention the presence of the mines and of the vessel or airplane planting the same is detected by a group of microphonic devices arranged at strategic points within the vicinity of the body of water within which the mines are planted, certain of the microphones being arranged along the shore of the body of water and others of the microphones being arranged within the water preferably at different depths of submergence. The microphones arranged along the shore are employed to detect the presence of an aircraft or surface vessel by signals received through the air, the signals detected by this group of microphones being amplified by a signal amplifying unit respectively connected to each of the microphones of the group having the output terminals thereof connected to a pair of filter mechanisms whereby signals detected by the microphones corresponding to an aircraft in flight or a surface vessel are employed to set in operation certain time delay devices thereby to initiate a cycle of operations of the system. This group of microphones is also adapted to detect a signal caused by the impact of a mine against the surface of the water.

There is also provided a second group of microphones within the body of water respectively associated with the microphonic devices of the first group adapted to detect the presence of a surface or submarine craft or the sound of an object striking the surface of the water, as the case may be, the signals received from the second group of microphonic devices being amplified by the aforesaid signal amplifying devices and adapted to set in operation the associated time delay devices when the signals received by the microphones are of a character adapted to be passed by the filter devices connected to the output of the signal amplifying devices. The operation of the time delay mechanism in response to signals of a predetermined character received from the microphones of the first or second group of devices, as the case may be, causes the operation of a starting relay and maintains the starting relay in an operated condition for a predetermined period of time after the signals initiating the operation of the time delay device have ceased or decreased in strength to a predetermined value. The operation of the starting relay causes a normally inactive second signal amplifying device to be rendered effective to amplify signals received from the associated microphone of the third group of microphones arranged within the water and at a considerably greater depth of submergence than the microphones of the second group. A filter is arranged preferably between each microphone of the third group and the second signal amplifying device thereby to cause the second signal amplifying device to amplify only signals having a predetermined frequency characteristic such, for example, as the signals produced by a heavy object striking the bed of the body of water.

There is also provided a recording device adapted to be set in operation by the aforesaid starting relay, the recording device having two recording elements controlled by the first and second signal amplifying devices respectively. The recording device is provided with a movable chart with which the first and second recording elements coact to draw a curve or graph whereby the signals received from the first and second signal amplifying devices are recorded on the moving chart during the time that the starting relay is in an operated condition. There is also provided a time stamp device adapted to impress upon the moving chart the time at which the recording instrument is set in operation by the starting relay and the time that the recording instrument is brought to rest at the completion of a predetermined period of time after the cycle initiating signal has been reduced to a predetermined value. An arrangement is thus provided in which signals received by the microphonic devices of the first and second groups are applied to the first named amplifying device such that signals received from an aircraft or surface vessel detected by a microphone of the first group or signals received from a surface or submarine vessel by the associated under water microphone of the second group may be employed to set the aforesaid timing mechanism in operation and render the second signal amplifying device and recording mechanism effective to record in timed relation upon a moving chart signals received from the microphones of each of the three groups.

There is also provided a time stamp device adapted to impress upon the moving chart the time at which the recording device is set in operation and the time at which the recording device is brought to rest. An arrangement is thus provided in which the time during which the recording instrument is in operation is recorded on the moving chart connected thereto and thus by providing a plurality of recording pens respectively controlled by microphonic devices receiving signals caused by the impact of the mine against the surface of the water through the medium of air and water respectively, the position of the mine within the bed of the water may be determined with a high degree of accuracy by reason of the difference in the rate of travel of the signals through the air and through the water respectively. Also by recording time signals on the moving chart of the recording instrument the exact time at which the mine is planted is indicated upon the moving chart. The present system provides an arrangement of circuits and instrumentalities in which the presence and position of planted mines within a body of water and the times of planting are disclosed by the charts of the various recording instruments.

One of the objects of the present invention is the provision of new and improved means for detecting and recording the planting of a mine within a body of water.

Another of the objects is the provision of new and improved means for recording the time at which a mine is planted within a body of water.

Another of the objects is the provision of new and improved means for determining the position of a planted mine within a body of water.

Another of the objects is to provide means for recording the passage of an aircraft in flight and the time of planting of a mine launched therefrom.

Another of the objects is the provision of new and improved means for setting a recording device in operation in response to signals received from a craft, and for maintaining the recording device in operation for a predetermined period of time after the signals received from the craft have decreased to a predetermined value.

A still further object is the provision of a normally inactive recording device adapted to be set in operation by signals received from a passing craft and brought to rest when a predetermined period of time has elapsed after the craft has passed a point of reference, and means responsive to signals received from the craft for recording the time of passage of the craft past the point of reference.

Various other objects, improvements and advantages will be apparent from the following description taken in connection with the accompanying drawings of which:

Figure 1:
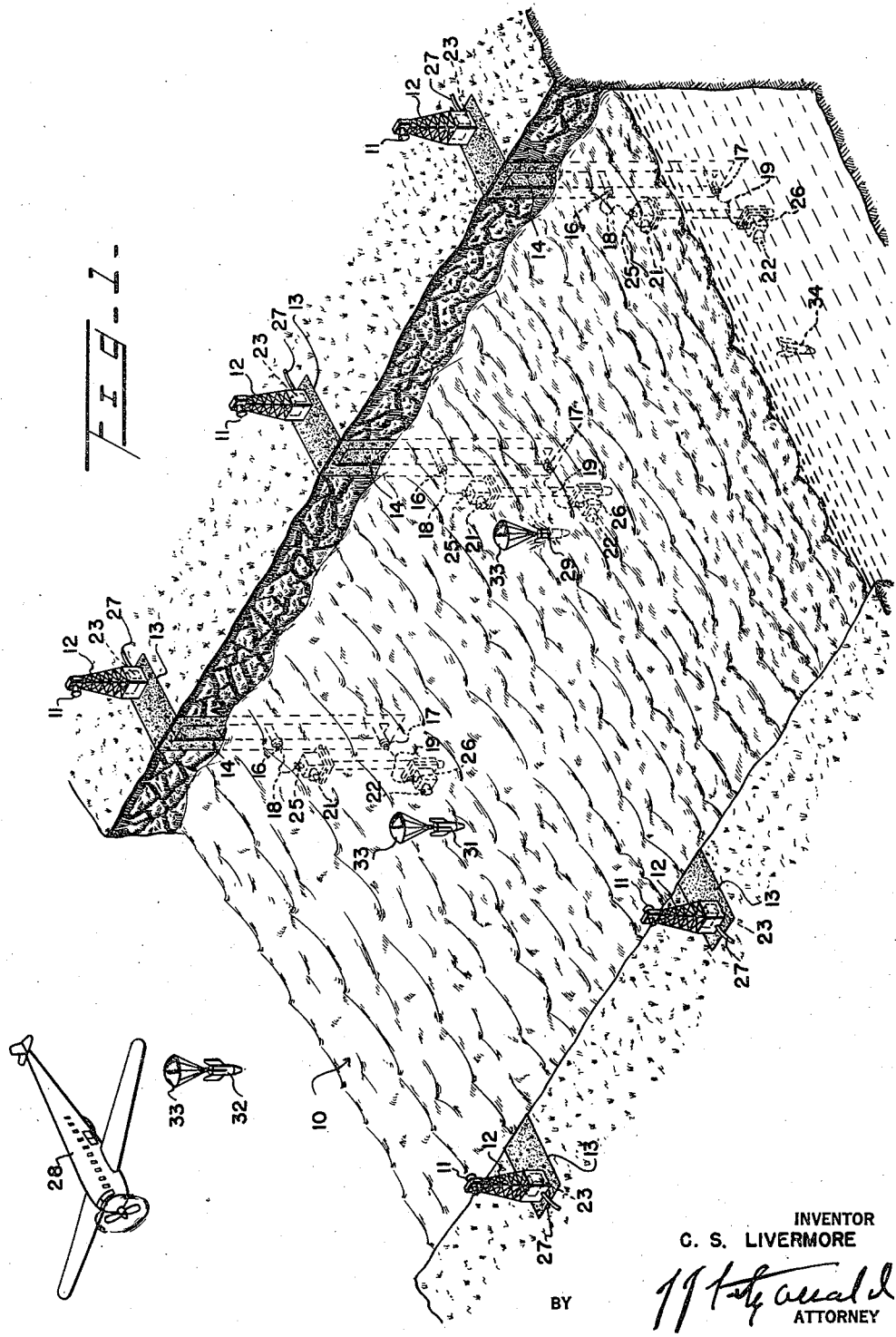
Fig. 1 is a view in perspective of an arrangement of detecting and recording devices in accordance with a preferred embodiment of the invention.
Figure 2:
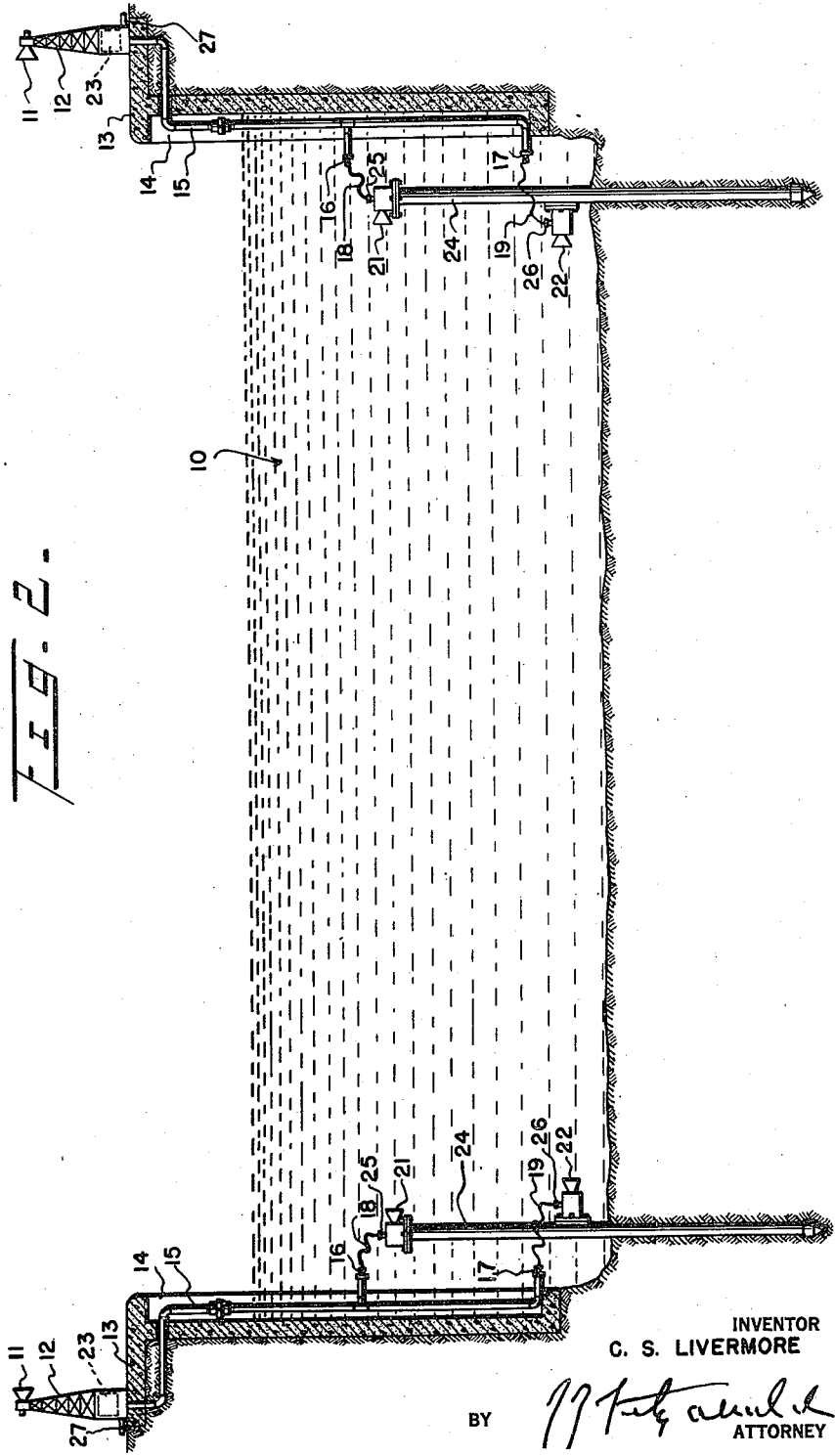
Fig. 2 is a transverse sectional view of the arrangement of Fig. 1.

Referring now to the drawings and more particularly to Figs. 1 and 2 thereof there is shown thereon a body of water such as a canal indicated generally by the numeral 10 having a plurality of directional microphones 11 supported in a predetermined arrangement or pattern as by the supports 12 arranged preferably upon a suitable bulwark 13 having a recess 14 therein which is disposed a suitable electrical conduit 15 preferably having water glands 16 and 17 within which are arranged the electrical cables 18 and 19 extending to the directional microphones 21 and 22 respectively whereby the under water microphones are electrically connected to certain control mechanism 23 arranged preferably within the supporting towers 12. The directional microphones 21 and 22 are maintained in predetermined spaced relation with respect to the body of water 10 and with respect to each other by reason of a rigid support 24 to which the microphones are secured in any suitable manner. The microphones 21 and 22, it will be understood, are suitably protected against damage by the water and provided with suitable glands 25 and 26 within which are arranged the electrical cables 18 and 19 respectively thereby providing an arrangement in which water is prevented from gaining admittance to the microphones. It will be understood that each of the microphones 21 and 22 is provided with a flexible diaphragm adapted to respond variably to pressure signals received by the microphones through the water for preventing direct contact of the water with the microphone, the variations being transmitted preferably from the flexible diaphragm to the microphone through a suitable fluid medium having substantially the same signal transmission characteristic as water.

The control mechanism 23 comprises, among other elements, a signal amplifying unit AU1, Fig. 3, controlled by the microphones 11 and 21, hereinafter referred to as M1 and M2, suitable filter elements, such as the filters F1 and F2 illustrated, being arranged between the output of the amplifier unit and the relay D of the time delay control mechanism. There is also provided within the control mechanism 23 a second signal amplifier unit AU2 controlled by the microphone 22, hereinafter referred to as M3, a suitable filter F3 being arranged between the amplifier AU2 and the microphone unit M3. The filter F1 is preferably of the type adapted to prevent all signals received from the microphones M1 and M2 from influencing the relay D except those signals caused by an airplane in flight. In a similar manner the filter F2 is adapted to exclude from the relay D all other signals except those signals having a frequency corresponding to the signal produced by the propulsion mechanism of surface or subsurface vessels. Whereas there are shown on Fig. 3 of the drawings two filters F1 and F2 it will, of course, be understood that this has been done by way of illustration and the filters F1 and F2 may, if desired, be combined in a single filter mechanism.

The amplifying unit AU1 is adapted to generate an output signal in response to a signal received from either of the microphones M1 or M2 sufficient to set in operation certain control and time delay devices thereby to cause the recording instrument to be effective to record the signals received by the microphones M1 ond M2 upon a moving chart or tape which is set in operation by the signals received from the signal amplifier AU1. The control mechanism, as will be described in more complete detail hereinafter, controls the operation of the second signal amplifying device AU2 whereby the sound of a falling object striking the bottom of the canal 10 is picked up by the microphone M3 and employed to control the signal amplifying unit AU2 thereby to actuate a second recording element of the recording instrument variably in accordance with the strength and character of the signal received by the microphone M3, the filter F3 being employed intermediate the microphone M3 and the signal amplifier AU2 to exclude from the amplifier all other signals except those represented by the impact of the falling body against the bed of the body of water. As will hereinafter be described in more complete detail, the recording instrument is adapted to record the time that the recording instrument is set into operation and the time when the recording instrument is brought to rest after each cycle of operations thereof has been completed.

Whereas on Fig. 1 the control mechanism 23 is shown within each of the supporting towers 12 it will, of course, be understood that this is by way of illustration and the control mechanism may be arranged at any suitable location such, for example, as a central control observation station which may be situated at a remote distance with respect to the detecting devices 11, 21 and 22 and connected thereto as by the cables 27 whereby, if desired, the entire canal or any portion thereof may be monitored at a convenient observation station from which instructions may be issued in regard to sweeping operations necessary to remove the planted mines or destroy their effectiveness. There is also shown on Fig. 1 an airplane 28 in flight from which the mines 29, 31 and 32 have been dropped in the order stated, each of the mines 29, 31 and 32 being provided preferably with a parachute such as the parachute 33 illustrated. At the moment of striking the water a signal is transmitted to the microphones 11 and 21 thereby recording the instant at which the mine struck the water and the distance of the planted mine from the microphones. Furthermore, by comparing the strength of the signal received by each of the microphones 11, 21 and 22 within the vicinity of the mine 29 the position of the mine 29 may be accurately determined. The airplane 28, it will be understood, has caused the various amplifiers and control mechanisms respectively associated therewith to be set in operation by signals received by the microphones 11 whereby the associated recording instruments are effective to record the signals caused by the impact of the mine 29 against the surface of the water and against the bed of the body of water. As will be readily understood, the impact of the mines 31 and 32 against the surface of the water also produces signals which are picked up by the microphones 21, the signals appearing on the associated recording instruments varying in strength in accordance with the relative position of the mines 31 and 32 with respect to the different microphones 21.

There is also shown in dashed outline on Fig. 1 a mine indicated generally by the numeral 34 at the instant of striking the bed of the body of water 10, the mine, as will be readily understood, being either of the type in which the parachute is released as the mine strikes the water or the type in which a parachute is not employed. When the mine 34 engaged the bed of the body of water 10, a signal was transmitted to the adjacent microphones 22, this signal passing through the associated filters F3 into the amplifying units AU2 whereby the amplified signals were recorded upon the associated recording instruments in different degrees of amplitude according to the relative position of the mine with respect ot the microphones 22. The recording instruments, it will be recalled, are arranged to be effective for a predetermined period of time after the airplane signal is first received by the microphone devices 11 and the microphones 21 and 22 are, therefore, effective to receive and transmit to their associated signal amplifier units, signals corresponding to the impact of the mine against the surface of the body of water and against the bed of the water respectively even though the mine was dropped from a considerable altitude such that the time of travel of the mine through the air is sufficient to delay the impact of the mine against the surface and bed of the water until after the airplane had passed beyond the threshhold of sensitivity of the microphonic devices 11.

Figure 4:
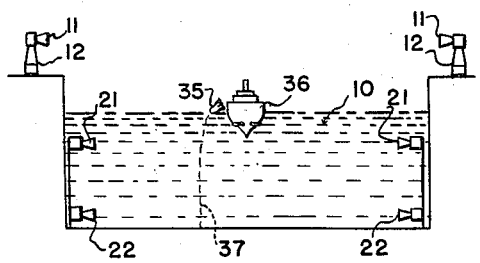
Figs. 4 and 5 show in diagrammatic form the launching of a mine from a surface vessel and a submarine respectively into the body of water of Figs. 1 and 2.

On Fig. 4 is shown a mine 35 launched from a vessel 36 at the instant of striking the surface of the body of water 10, the downward path of travel of the mine through the water being indicated by the dashed line 37. The surface craft 36 is detected by the microphones 11 and 21, and the movement of the vessel past the microphones 11 and 21 is indicated by the curve or graph executed by the recording element controlled by the microphones 11 and 21. As the mine 35 strikes the surface of the water, the curve or graph executed by the pen controlled by the microphones 11 and 21 is sharply accentuated in response to the signal received from the microphone 21 and subsequently accentuated by the signal received by the microphone 11 by reason of the difference in the rate of travel of the signal through the water and air respectively, the displacement of these two signals on the chart with respect to each other being proportional to the distance of the mine from the microphones 11 and 21. As the mine 35 comes to the end of its travel indicated by the dashed line 37 into contact with the bed of the body of water 10, the microphones 22 receive a characteristic signal thereby causing the associated recording elements to be moved variably to record the striking of the mine against the bed of a body of water in timed relation with respect to a recorded time characteristic.

Figure 5:
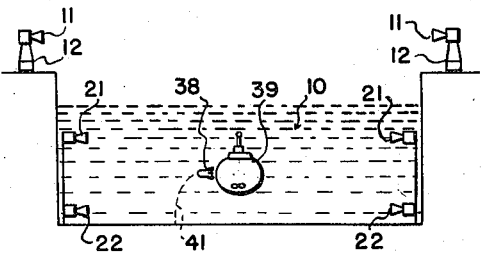
Figure 6:
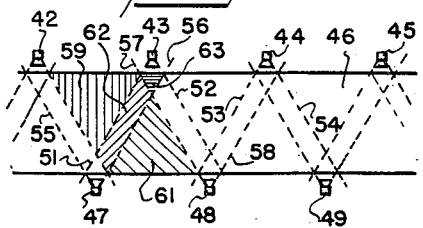
Fig. 6 shows in diagrammatic form the directional effect of the microphones employed with the arrangement of Figs. 1 and 2.

On Fig. 5 is illustrated a mine 38 at the moment of launching from a submarine 39, the mine continuing its downward movement along a path of travel indicated by the dashed line 41 until it strikes the bed of the body of water. The approach of the submarine 39 and the movement of the submarine past the microphones 21 and 22 is indicated on the moving chart of the recording instrument by a graph corresponding to signals caused by the propulsion mechanism of the submarine and received by the microphones 21, the microphones 21 also receiving the characteristic impulse caused by the expulsion of the mine from the torpedo tube of the submarine. An arrangement is thus provided in which the movement of a submarine past a point of reference is recorded on a moving chart and the expulsion of a submarine mine or torpedo therefrom is also recorded under control of the microphones 21, and in which the impact of the mine against the bed of the water is detected by the microphones 22 and recorded upon the recording instrument within that portion of the moving chart of the instrument embraced within certain time markings recorded thereon whereby the time of launching and of the striking of the mine against the bed of the water may be determined with a high degree of precision. On Fig. 6 is shown a plurality of directional microphones 42, 43, 44 and 45 arranged on one side of a body of water 46 and a second group of microphones 47, 48 and 49 arranged on the opposite side of the body of water in a manner generally similar to the arrangement of Fig. 1, each of the microphones being arranged in such a manner as to include preferably two of the microphones on the opposite side of the water within the range of sensitivity of detection of each microphone. The area of detection of each of the microphones is indicated by the dashed lines converging thereat such, for example, as the dashed lines 51 and 52 associated with the microphone 43 within which the microphones 47 and 48 are preferably included. In a similar manner the dashed lines 53 and 54 indicate the range of detection of the microphone 44, the lines 55 and 56 the range of detection of the microphone 47 and the lines 57 and 58 the range of detection of the microphone 48.

With this arrangement a mine falling within the shaded area 59 would produce a signal indication at the microphone 47 only and the signal would be recorded on the recording instrument associated therewith. In a similar manner the planting of a mine within the shaded area 61 would be recorded on the recording instrument associated with the microphone 43. In the event that the mine should be planted within the shaded area 62 the characteristic signal corresponding thereto would be recorded on the recording instruments associated with the microphones 43 and 47 and in the event that the mine should be planted within the shaded area 63 the characteristic signal corresponding thereto would be recorded on the recording instruments associated with the microphones 43, 47 and 48. By providing a system in which a signal indication is recorded on a plurality of recording instruments in which the amplitude of the signal received by the associated microphone is made manifest by the amplitude of the recorded signal, the position of the planted mine may be determined and, as will be readily understood, the work of removing the mine or rendering the same ineffective prior to the passage of a vessel is greatly facilitated. Whereas in Fig. 6 the microphones 42 to 45 and 47 to 49 are each illustrated diagrammatically as a single microphone, it will be understood, that this has been done for descriptive purposes only and each of the microphones illustrated may represent a plurality or group of microphones such, for example, as the associated microphones 11, 21 and 22 of Fig. 1.

Figure 7:
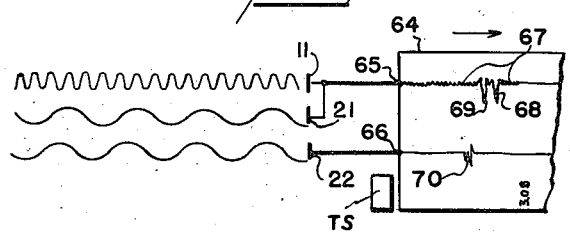
Fig. 7 illustrates diagrammatically the speed of transmission of a signal through the medium of air and water respectively.

The difference in the rate of travel of the pressure or sound wave from a source of origin through mediums of different densities such, for example, as air and water will best be understood by reference to Fig. 7 of the drawings on which is shown a moving tape 64 which is set in operation at 3:08 by a craft such as the vessel 36 of Fig. 4 in response to signals detected by the microphones 11 or 21, as the case may be. The tape 64 is associated with a recording instrument having the recording elements 65 and 66 thereof operatively connected by way of certain signal amplifying devices and filter mechanisms to the microphones 11, 21 and 22 in such a manner that the recording element 65 is adapted to be actuated by signals received from the microphones 11 and 21 and the pen 66 is adapted to be actuated by signals received from the microphone 22.

That portion of the graph traced by the pen 65 indicated generally by the numeral 67 thereof corresponds to impulses received from the propulsion mechanism of the vessel 36, these signals being detected at 3:08 by the microphones 11 or 21 thereby setting the recording instrument in operation and at the same time printing the characters 3:08 by the time stamp TS on the movable chart 64. When the mine 35 struck the surface of the water a signal wave of pressure was transmitted through the water to the microphone 21 and concurrently therewith through the air to the microphone 11. As is well known, the speed of transmission of a signal impulse through the water is substantially 4800 feet per second, whereas the rate of travel of a signal impulse through the air is substantially 1088 feet per second. It will, therefore, be understood that the signal will be received by the microphone 21 through the water as the result of the mine striking the water before this signal is received by the microphone 11 by reason of the difference in the rate of travel of the signal through the water and through the air respectively. The pen 65, it will be recalled, is adapted to respond to signals received from both of the microphones 21 and 11, the signal received by the microphone 21 as the result of the mine striking the water being indicated at 68 and the signal received by the microphone 11 by the portion 69 of the curve traced by the pen 65. As the mine strikes the bed of the body of water the signal produced thereby is received by the microphone 22 thereby actuating the recording element 66 and thus recording the signal indicated by the portion 70 of the graph traced by the pen 66.

The speed of the movable chart is controlled by a constant speed motor MO and therefore the rate of travel of the chart 64 is uniform and for this reason the distance of the mine from the microphones 11 and 21 is proportional to the displacement between the accentuated portions 68 and 69 of the curve traced by the recording element 65. The chart 64 may, if desired, be provided with suitable scale markings whereby the displacement of the points 68 and 69 with respect to each other may be read directly in feet, yards, or any other suitable unit of distance and thus the recording instrument may be employed as a direct reading instrument for determining the distance of the planted mine from the microphones 11 and 21 controlling the recording instrument. The depth of the water above the planted mine may also be determined by a second set of suitable scale markings on the chart 64 by the displacement of the points 68 and 70 with respect to each other, the rate of descent of the mine within the water being known.

Figure 8:
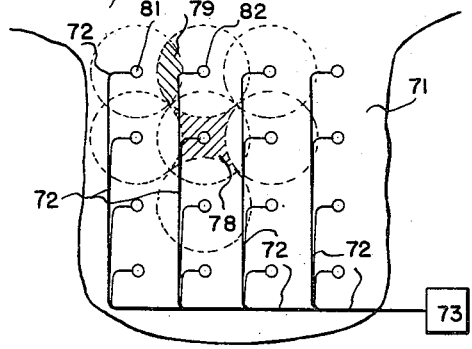
Fig. 8 shows an array of non-directional microphone units for detecting and locating mines planted within a body of water such as a harbor.

Fig. 8 illustrates an arrangement of non-directional microphones suitable for protecting an inlet or harbor 71 in which the microphones are arranged in a predetermined pattern in pairs preferably such that the zone of detection of each of the respective pairs of microphones somewhat overlaps the zone of detection of the adjacent pair of microphones. The microphones of each pair are preferably connected by a suitable submarine cable 72 to an observation station 73 located, for example, on the shore, the observation station including, among other elements, a plurality of recording instruments having a pair of recording elements respectively associated with each pair of microphones.

Figure 9:
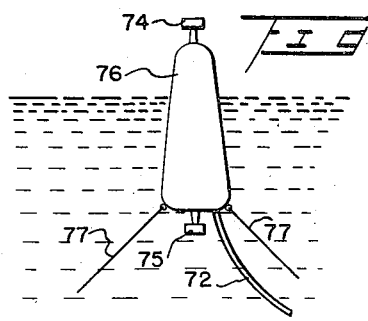
Fig. 9 is a view in elevation, greatly enlarged, of one of the microphone units of Fig. 8 and the supporting means therefor.

The microphones may be of any type suitable for the purpose such, for example, as the microphones illustrated at 74 and 75, Fig. 9, located at the upper and lower portions respectively of a buoy or float 76 moored in a predetermined position as by anchors secured to the mooring cables 77 such that the microphone 74 receives signals through the air and the microphone 75 receives signals through the water. By employing an arrangement in which the zone of detection of each pair of microphones overlaps the zone of detection of the microphones of an adjacent pair in the manner illustrated, an arrangement is provided in which the location of a submarine mine planted within the harbor 71 is made manifest by the signals recorded by the recorders, the location of each mine being accurately determined by the character and amplitude of the signals appearing on the several recorders associated with the microphones adjacent the planted mine. If, for example, the mine is planted within the shaded portion 78 of the harbor, the pair of microphones within the shaded portion will cause a signal to be recorded corresponding to the location of the mine within the shaded area and no corresponding signal will appear upon the recording instruments associated with the adjacent pair of microphones. Should, however, the mine be planted within the shaded area 79 the signal will appear on the recording instruments associated with the detecting devices 81 and 82 and thus the location of the mine is made known by the recording devices. Furthermore, by employing a pair of microphones arranged in the air and water respectively with each buoy 76 an arrangement is provided in which the several pairs of microphones may be connected to signal amplifying and recording devices generally in the manner of the microphones M1 and M2 of Fig. 3 and the associated recording instrument is set in operation by the approach of a craft regardless of whether the craft is an airplane, surface vessel or submarine and thus there is no possibility of the planting of a submarine mine surreptitiously by the enemy within the harbor 71 without recordation of the planting on the recorders associated with the pairs of microphones.

Figure 10:
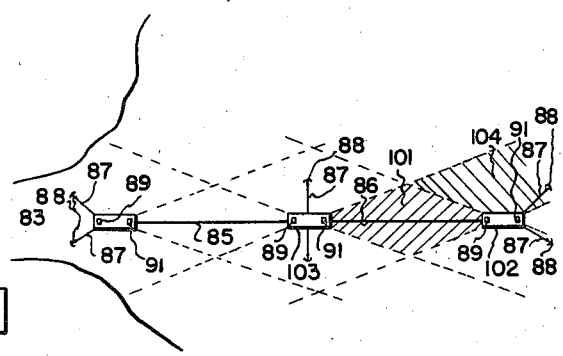
Fig. 10 shows an alternative arrangement of directional microphones adapted to protect the entrance to a harbor.
Figure 11:
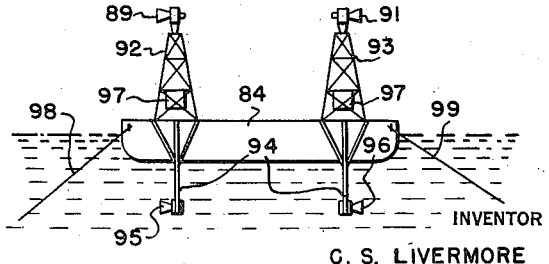
Fig. 11 is a view in elevation, greatly enlarged, of one of the microphone units of Fig. 10.

On Fig. 10 is shown another arrangement of microphones suitable for use with the present invention adapted to protect the entrance to a river or harbor 83 in which the microphones are directional in character and mounted upon barges or floats such, for example, as the float of Fig. 11, the various floats being preferably connected together as by the ropes or cables 85 and 86 and maintained in a desired position as by the mooring lines 87 and anchors 88. Each float may, if desired, be provided with means for supporting the directional microphones 89 and 91 such as the towers 92 and 93 illustrated. There is also provided a plurality of brackets 94 for supporting the microphones 95 and 96 beneath the surface of the water. The barge is adapted to support the filter and signal amplifying equipment together with the control mechanism required for the operation of recording instruments, indicated generally at 97. The particular arrangement of Fig. 11 includes a pair of mooring cables 98 and 99 adapted to moor the barge 84 in any desired position independently of other barges or floats within the vicinity of the barge 84.

By reason of the employment of directional type microphones, the location of a planted mine within a predetermined area may be determined from an inspection of the charts of the recording instruments associated with adjacent microphones. A mine planted within the shaded area 101, for example, would be made manifest by the appearance of a signal on the charts of the recording instruments associated with the microphones 89 and 91 of the barges 102 and 103 respectively, whereas a mine planted within the shaded area 104, for example, would appear only on the recording instrument associated with the microphone 91 of the barge 103. Furthermore, by employing pairs of microphones in communication with the air and water respectively, the distance of the planted mine from each pair of microphones is recorded by the recording instrument associated therewith by reason of the difference in the rate of travel of the signal through the air and through the water caused by the impact of the mine against the surface of the water. Whereas, in Figs. 8 and 10 the microphones are shown arranged in pairs it will, of course, be understood that, if desired, the microphones may be arranged singly, in which case the location of the mine would be determined solely by the character and intensity of the signals appearing on the recorders associated with adjacent microphones in which the signals have substantially the same relation with respect to time.

Figure 3:
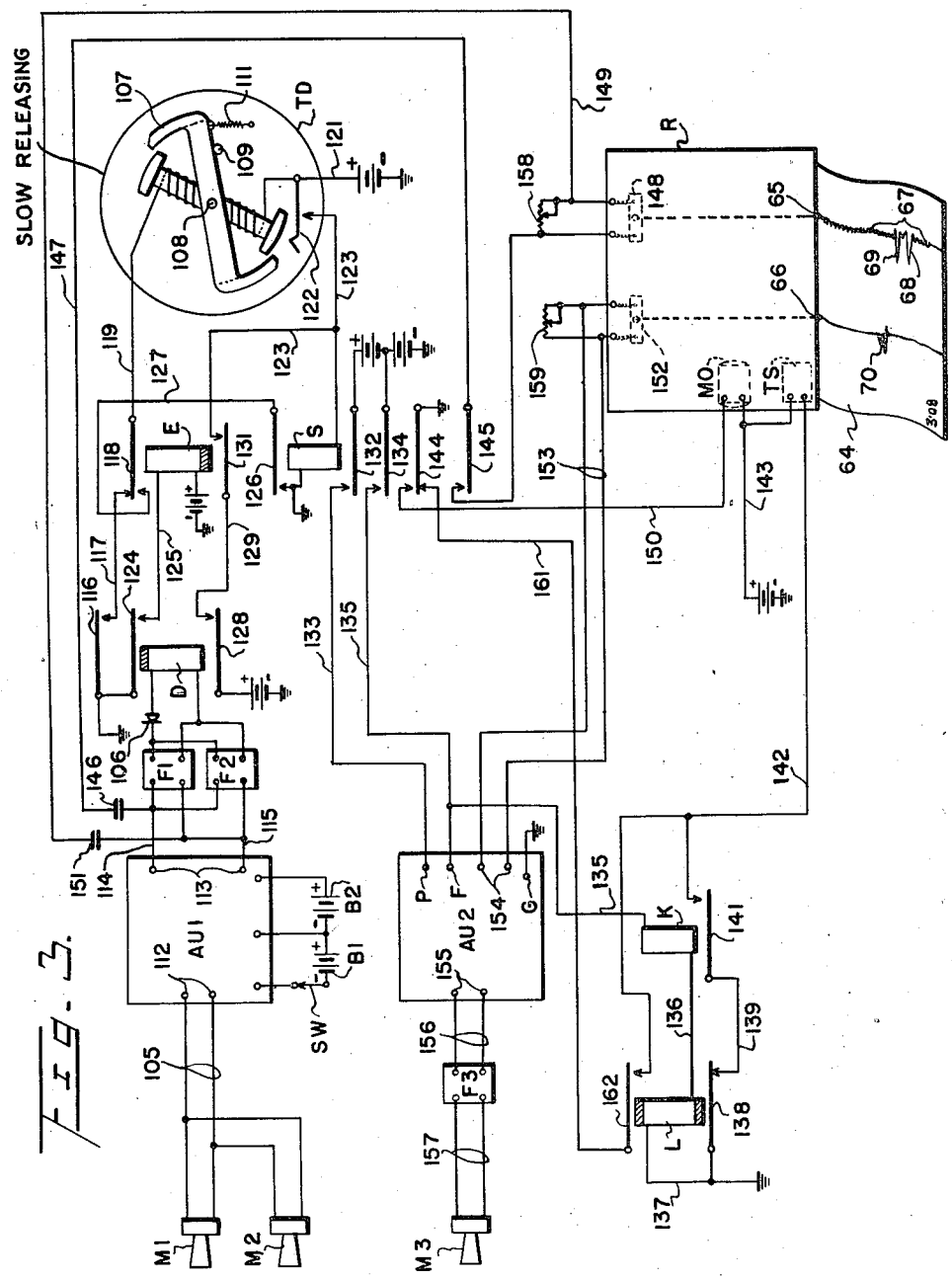
Fig. 3 illustrates in diagrammatic form a complete system suitable for use with the arrangement of Fig. 1.

The operation of the system of the present invention will best be understood by reference to Fig. 3 of the drawings on which is shown an arrangement of circuits and instrumentalities suitable for use with the arrangement of Fig. 1, the system comprising, among other elements, a pair of microphones M1 and M2 connected to the input of a signal amplifying device AU1 as by the pair of conductors 105. The signal amplifying device AU1 may be of any type suitable for the purpose such, for example, as a vacuum tube amplifying unit adapted to be energized by the batteries B1 and B2 when the switch SW is in the closed position, the battery B1 being employed preferably to heat the filaments of the signal amplifying tubes. With the switch SW in closed position the system is adapted to be set in operation at any time by signals received from the microphones M1 or M2. The output of the amplifier AU1 is connected by way of the filters F1 and F2 to a relay D, a current rectifying element 106 of any type suitable for the purpose such, for example, as a copper oxide rectifier being included preferably in the operating circuit of relay D thereby to insure the operation of relay D in response to signals received from the amplifying unit AU1. Relay D, it will be noted, is a slow operating relay by reason of the provision of a copper sleeve about the core of the electromagnet thereof or by reason of a dash pot or similar device whereby the signals received from the signal amplifying unit AU1 are required to be applied to the winding of relay D for a predetermined period of time before relay D operates such, for example, as the signals received from an airplane or passing vessel and thus an arrangement is provided in which the initiation of a cycle of operations of the system by extraneous signals of relatively short duration received by the microphones M1 and M2 is prevented.

The operation of relay D causes a time delay device TD to be set in operation thereby to prevent the cycle of operations of the system from being completed until a predetermined period of time has elapsed after the signals received by the microphones M1 and M2 have ceased or been reduced in strength to a predetermined value. The time delay device TD may be of any type suitable for the purpose in which a pair of electrical contacts are moved to closed position quickly in response to the energization of an electromagnet and maintained in the closed position until a predetermined period of time such, for example, as two minutes, has elapsed after the operating circuit to the electromagnet has been interrupted. A preferred form of the time delay device is shown on Fig. 3 which includes a rotatable armature 107 pivoted as at 108 and yieldably urged against a back stop 109 by a retractile spring 111, the device including an escapement mechanism or other time delay means to retard the return of the armature to the unoperated position when the electromagnet is deenergized. A pair of electrical contacts are adapted to be moved to the closed position as the armature 107 is operated, the contacts remaining in closed position until the armature has returned to the unoperated position at the completion of a predetermined interval of time following the deenergization of the electromagnet of the device.

There is also provided a starting relay S adapted to be set in operation by relay D. Relay S causes a second signal amplifying device AU2 to be energized thereby to render the microphone M3 effective to transmit signals by way of the filter F3 and signal amplifier AU2 to a recording element of the recording device R. The recorder R is adapted to be set in operation by the relay S whereby the chart 64 issuing therefrom remains at rest at all times except when relay S is operated thereby providing an arrangement in which the chart is used in an efficient and economical manner. The recorder R is also provided with a time stamp TS adapted to print upon the chart 64 the time during which the recorder is in operation, the time stamp being controlled by a slow acting relay L and the relay K in response to the operation of relay S. The recorder also includes a second recording element controlled by the output of the signal amplifying device AU1.

Let it be assumed, by way of example, that the recorder R is provided with a copious supply of recording material and that the switch SW has been moved to the closed position and let it further be assumed that an airplane, such as the airplane 28 of Fig. 1, is in flight on a course such that a mine carried by the airplane may be dropped into the body of water 10. When the airplane enters the range of detection of the microphone M1, a signal is transmitted by way of the pair of conductors 105 to the input terminals 112 of the signal amplifying device AU1, the amplified signal at the output terminals 113 thereof flowing through the conductors 114 and 115 by way of filter F1 through the winding of relay D and the rectifying element 106 thereby causing relay D to operate. As armature 116 of relay D moves into engagement with its make contact, ground is applied to conductor 117, break contact and armature 118 of relay E, conductor 119, winding of the electromagnet of the time delay device TD, conductor 121 and thence to battery thereby causing armature 107 of relay TD to be actuated quickly to the operated position thereof and move the contact spring 122 into engagement with its make contact. When this occurs, battery at conductor 121 is applied by way of contact spring 122 and make contact of the time delay device TD, conductor 123, winding of relay S and thence to ground thereby causing relay S to operate.

As armature 124 of relay D moves into engagement with its make contact, ground is applied to conductor 125, the circuit continuing by way of winding of relay E to battery thereby causing relay E to operate. Relay E, it will be noted, is a slow operating relay and, for this reason, does not move its armatures to the operated position until relay TD has operated. As armature 118 of relay E engages its make contact the operating circuit of the electromagnet of the time delay device TD is transferred from the make contact and armature 116 of relay D to the armature 126 and make contact of relay S, the time delay device TD now being held operated over the following circuit: battery at conductor 121, winding of time delay device TD, conductor 119, armature 118 and make contact of relay E, conductor 127, armature 126 and make contact of relay S and thence to ground. A circuit is also closed from battery at armature 128 and make contact of relay D, conductor 129, armature 131 and make contact of relay E, conductor 123 and thence to the winding of relay S. Armature 132 of relay S applies positive potential by way of conductor 133 to the terminal P of the signal amplifying unit AU2 thereby to set up a positive potential at the plates of the signal amplifying tubes of the amplifier. As armature 134 of relay S moves into engagement with its make contact, battery potential is applied by way of conductor 135 to the terminal F of the amplifier AU2 thereby heating the filaments of the amplifying tubes, the circuit continuing by way of terminal G of the signal amplifier AU2 to ground. The operation of relay S at the armature 134 thereof also applies battery by way of conductor 135, to the winding of relay K, the circuit continuing by way of conductor 136, winding of relay L, conductor 137 and thence to ground thereby causing relays K and L to operate. Relay L, as heretofore stated, is a slow acting relay being both slow to operate and slow to release and for this reason does not operate until a predetermined period of time has elapsed after relay K operates. The operation of relay K closes a circuit from grounded armature 138 and break contact of relay L, conductor 139, armature 141 and make contact of relay K, conductor 142, winding of the operating magnet of the time stamp TS, conductor 143 and thence to battery thereby causing the time stamp to operate and impress upon the chart 64 characters representing the time of day. As armature 138 of relay L moves away from its break contact, ground is removed from one end of the winding of the operating magnet of the time stamp thereby causing the time stamp to release.

As armature 144 of relay S moves into engagement with its make contact ground is applied by way of conductor 150 to the motor MO of the recording instrument, the circuit continuing by way of conductor 143 to battery thereby causing the motor to operate and set the chart 64 in motion. The motor MO is a constant speed motor and for this reason the chart 64 moves at a predetermined uniform rate of travel whereby the time differential corresponding to the displacement of the accentuated portions of the curves traced by the recording elements 65 and 66 coact with the aforesaid scale markings on the chart 64 and with the time information recorded thereon by the time stamp TS to give an accurate indication of the time when each signal is received by the microphones M1, M2 and M3 and the distance of the planted mine from the microphones.

As armature 145 of relay S engages its make contact a circuit is closed from the output terminals 113 of the signal amplifier AU1 by way of conductor 114, condenser 146, conductor 147, armature 145 and make contact of relay S, winding of the pen actuating coil 148, conductor 149, condenser 151, conductor 115 and thence to the other of the output terminals 113 whereby the recording element 65 is adapted to be moved variably in accordance with the signals received by the coil 148 from the amplifying unit AU1. The recording element 66 is actuated by the movable coil 152 having the terminals thereof connected by way of the pair of conductors 153 to the output terminals 154 of the signal amplifying unit AU2. The input terminals 155 of the amplifying unit AU2 are connected by the conductors 156 to the filter device F3 from whence the circuit is continued by way of the conductors 157 to the microphone M3. The movable coil 148, it will be noted, is preferably shunted by a variable resistor 158 thereby to control the degree of sensitivity of the coil 148 to the electrical signals applied thereto. In a similar manner the coil 152 is preferably shunted by the variable resistor 159 thereby to control the sensitivity of the coil 152 to the output signals from the signal amplifier AU2.

As the mine strikes the water a signal is received by each of the microphones M2 and M1 in the order named by reason of the more rapid travel of the signal through the water than through the air. The amplified signal received from the microphone M2 is illustrated at 68 on the curve traced by the pen element 65 and the signal received by the microphone M1 is shown at 69 displaced from the signal 68 variably in accordance with the distance of the planted mine from the microphones M1 and M2. The signal caused by the airplane is illustrated at 67 on the curve traced by the pen 65. When the mine strikes the bed of the body of water the microphone M3 receives a signal illustrated at 70 on the curve traced by the recording pen 66, the time of travel of the mine through the water being shown on the chart 64 by the displacement between the points 68 and 70 of the curves traced by the pens 65 and 66 respectively.

When the airplane moves beyond the range of detection of the microphone M1, relay D releases and at armature 124 thereof removes ground from the winding of relay E thereby causing relay E to release. As armature 118 of relay E moves away from its make contact, ground is removed from conductor 118 thereby causing the operating magnet of the time delay device TD to be de-energized. After a predetermined time delay such, for example, as two minutes, armature 107 of relay TD releases sufficiently to cause the contact spring 122 to be disengaged from its make contact and remove battery from conductor 123 thereby releasing relay S. The release of relay S at armatures 132 and 134 thereof removes battery from the signal amplifier AU2, the armature 134 also removing battery from the windings of relays K and L thereby causing relays K and L to release, relay L releasing somewhat later than relay K by reason of the slow acting nature of relay L. As armature 144 of relay S moves away from its make contact ground is removed from conductor 150 thereby causing the motor MO and the chart 64 of the recording instrument to be brought to rest. As armature 144 of relay S engages its break contact, ground is applied to conductor 161, armature 162 and make contact of relay L, conductor 142, winding of the time stamp device TS, conductor 143 from whence the circuit is continued to battery thereby causing the time stamp to operate and impress upon the chart 64 the characters representing the time at which the chart is brought to rest. As the armature 162 of the slow acting relay L moves away from its make contact ground is removed from conductor 142 thereby deenergizing the electromagnet of the time stamp. As armature 145 of relay S moves away from its make contact the movable coil 148 of the recording element 65 is operatively disconnected from the output terminals 113 of the signal amplifying device AU1. A cycle of operations of the system has now been completed in which the presence of the aircraft within the vicinity of the microphone M1 has been recorded on the chart 64, the signals received by the microphones M2 and M1 corresponding to the impact of the mine against the bed of the body of water being also recorded on the chart 64 in timed relation with respect to certain time markings impressed thereon by the time stamp TS representing the time at which these events occurred and the system is again brought to rest.

In the event that, for any reason, the time delay device TD has failed to operate in response to the application of ground to the conductor 117 by armature 116 and make contact of relay D sufficiently to close the contact 122 thereof by the time relay E has operated, relay S is caused to operate over the following circuit: battery at armature 128 and make contact of relay D, conductor 129, armature 131 and make contact of relay E, conductor 123, winding of relay S and thence to ground. As armature 126 of relay S moves into engagement with its make contact ground is applied to conductor 127, make contact and armature 118 of relay E, conductor 119, winding of the time delay device TD, conductor 121 from whence the circuit is continued to battery thereby maintaining the electromagnet of the time delay device TD in an energized condition for a period of time at least as long as signals are received by relay D of sufficient strength to maintain relay D operated. As armature 107 of the time delay device TD moves away from its initial or home position contact spring 122 thereof engages its make contact thereby maintaining relay S operated for a period of time after relay D releases.

In the event that a surface vessel or submarine approaches within the range of detection of the microphone M2 a signal is transmitted to the signal amplifying device AU1, the amplified signal at the output terminals 113 thereof passing through the filter F2 and thence through the winding of relay D and rectifying element 106 thereby causing relay D to operate and thus initiate a cycle of operations of the system, the relay D remaining operated until the signals received by the microphone M2 have decreased sufficiently in strength to permit relay D to release. It will, of course, be obvious that in the event signals are received concurrently by the microphones M1 and M2 from an airplane in flight and from a naval vessel, the relay D will remain operated until the signals received from the microphones M1 and M2 have decreased to a predetermined value of strength and the recording element 65 will trace a characteristic pattern or graph upon the moving chart 64 corresponding to the combined signals received from the microphones M1 and M2.

Briefly stated in summary, the present invention contemplates the provision of a system comprising an arrangement of circuits and instrumentalities therefor adapted to be set in operation by a craft moving within the vicinity of the device in which means are provided for recording the movement of the craft within the vicinity of the device and in which a record is made of the mines planted within the vicinity of the device, the recorded information including the time of planting of the mines and the location of the same within the area protected by the system, means also being provided in the system for maintaining the recording means effective to record the signals received by the detecting means for a predetermined period of time after the signals originating the operation of the system have decreased in strength to a predetermined value.

While the invention has been described with reference to certain preferred examples thereof which give satisfactory results, it will be understood by those skilled in the art to which the invention pertains, after understanding the invention, that various changes and modifications may be made without departing from the spirit and scope of the invention, and it is my intention therefore to cover in the appended claims all such changes and modifications.

The invention herein described and claimed may be manufactured and used by or for the Government of the United States of America for governmental purposes without the payment of any royalties thereon or therefor.

What is claimed as new and desired to be secured by Letters Patent of the United States is:

1. In a system of the character disclosed for recording information concerning mines planted within a body of water by a passing craft, means including a signal amplifier for detecting signals received from said craft, recording means having a pair of recording elements therein, means controlled by the signals received from said signal amplifier for setting the recording means in operation in response to signals received from said craft, means including a plurality of circuit connections for operatively connecting one of said pair of recording elements to the output of said signal amplifier thereby to cause the signals received from said craft to be recorded by said recording means, a second signal amplifying device having a microphonic device arranged within said body of water and operatively connected to the input thereof, means for connecting the output of said signal amplifying device to the other of said pair of recording elements, means controlled by the output of said signal amplifier for rendering said second signal amplifying device effective to amplify the signals received thereby to record the signal corresponding to the impact of said mine against the bed of said body of water, and means for maintaining said recording device and said second signal amplifying device effective to record signals received from said detecting means and microphonic device respectively for a predetermined period of time after signals received by the detecting means have been decreased in strength to a predetermined value.

2. In a system of the character disclosed for recording information concerning mines planted within a body of water by a passing craft, means for detecting signals caused by the presence of the craft within the vicinity of the body of water, means responsive to impulses of hydrostatic pressure received through the water corresponding to the impact of the mine against the surface of the water for generating electrical signals, means for recording signals detected by said detecting means and the electrical signals generated by said signal generating means, means for rendering the recording means operative to record said signals when the signals are received, and means for rendering said recording means inoperative to record said signals a predetermined period of time after signals received by said detecting means have been decreased in strength to a predetermined value.

3. In a system of the character disclosed for recording information concerning mines planted within a body of water from a moving craft, a recording device, means responsive to signals received from the craft for causing the recording device to be set in operation to record said signals, means responsive to the impact of the mine against the water for causing a characteristic signal to be recorded by said recording device in timed relation with respect to the signals received from said craft, means controlled by signals received through the water for causing an additional signal to be recorded by said recording device in timed relation with respect to said characteristic signal, and means controlled by the signals received from the craft for maintaining the recording device continuously in operation until the signals received from the craft have decreased to a predetermined value.

4. In a system for detecting the presence of mines planted within a body of water from a moving craft, the combination of a microphonic device in communication with the air adapted to receive signals from the craft and a signal corresponding to the impact of the mine against the water, a second microphonic device in communication with the water adapted to receive a signal through the water corresponding to the impact of the mine against the surface of the water, signal amplifying means operatively connected to each of the microphonic devices, a recording instrument having a recording element operatively connected to said signal amplifying means adapted to be actuated variably in accordance with the strength of signals received from each of said microphonic devices, a movable chart associated with said recording element, normally inactive means adapted to cause said chart to be moved at a constant rate of speed whereby the distance of the planted mine from said microphonic devices is proportional to the displacement of the signals recorded on the chart by the recording element in response to signals received by each of said microphonic devices in succession, means controlled by the signals from the craft for operating the chart moving means until the signals received from the craft have decreased to a predetermined value, and means for recording time information characters on said chart when the first of said successive signals is received.

5. In a system of the character disclosed for recording information concerning a submarine mine planted within a body of water from an aircraft in flight, means including an amplifier device for generating electrical signals corresponding to signal impulses received from said aircraft, means including a relay operatively connected to said amplifier device for initiating a cycle of operations of the system in response to electrical signals received from said signal generating means, means for recording the signals received from said signal amplifier device during said cycle of operations of the system, means for receiving a signal of hydrostatic pressure through the water corresponding to the impact of the mine against the bed of the body of water, a recording device, means for recording said hydrostatic pressure signal on said recording device during said cycle of operations, and means for continuing said cycle of operations for a predetermined period of time after the signals received from said electrical signal generating means have decreased in strength to a predetermined value.

6. In a system of the character disclosed for recording information concerning mines planted by a craft within a body of water, the combination of means for detecting a signal received from said craft, means for amplifying the detected signal, an electrical relay adapted to be operated by said signal amplifying means, an electro-responsive time delay device controlled by said relay having means for closing an electrical circuit as the time delay device operates, a starting relay connected to said electrical circuit and controlled by the circuit closing means of said time delay device, recording means adapted to be set in operation by said starting relay having means operatively connected to said signal amplifying means for recording signals received from the signal amplifying means, means controlled by said electrical relay for causing said time delay device to disengage said circuit closing means when a predetermined period of time has elapsed after the relay is released thereby to interrupt said electrical circuit and release said starting relay.

7. In a system for recording information concerning mines planted by a craft within a body of water, a microphonic device for detecting said craft within the vicinity of the body of water and having means for generating signals variably in accordance with the degree of proximity of said craft with respect thereto, signal amplifying means operatively connected to said microphonic device, a filter device connected to the output of said signal amplifying means and having an electrical relay operatively connected thereto adapted to operate in response to signals of predetermined character received from said filter device, a time delay device controlled by said electrical relay, a starting relay adapted to be controlled by said time delay device, a normally inactive recording device adapted to record signals received from said signal amplifying means on a movable chart, means controlled by said starting relay for setting said recording device in operation, means for recording time information characters on said recording chart as the recording means is set in operation by said starting relay to record signals received from said signal amplifying means, means controlled by said electrical relay for causing said time delay device to release the starting relay when a predetermined period of time has elapsed after the electrical relay has released, and means for recording additional time information on said movable chart in response to the release of said starting relay.

8. In a system of the character disclosed for recording information concerning submarine mines planted within a body of water from an aircraft in flight, means for detecting signals received from the aircraft, a signal amplifying device connected to said signal detecting means, a recording instrument having a first recording element operatively connected to said signal amplifying device adapted to be actuated variably in accordance with the strength of signals received by said signal detecting means, means for receiving a signal through the water as each submarine mine is planted therein, amplifying means operatively connected to said signal receiving means and adapted to amplify the signals received by said signal receiving means, means operatively connected to said signal amplifying device adapted to energize said amplifying means continuously until the signals received by said signal detecting means are reduced in strength to a predetermined value, a second recording element on said recording instrument adapted to be actuated variably in accordance with signals received by said signal receiving means, and means on said recording instrument for recording time information characters corresponding respectively to the time the signals are first detected and to the time the signals have decreased in strength to a predetermined value.

9. In a system of the character disclosed for recording information concerning submarine mines planted within a body of water by a moving craft, a signal amplifying device having microphonic means connected to the input thereof for detecting signals received from said craft, a filter device connected to the output of said signal amplifying device adapted to pass signals therethrough corresponding to signals caused by the propulsion mechanism of said moving craft, rectifying means operatively connected to said filter device, an electro-responsive device connected in circuit with said filter device and said signal rectifying means and adapted to be operated by the rectified signals passed by said filter device, a normally inactive recording instrument having a first recording element thereof operatively connected to the output of said signal amplifying device, means controlled by said electro-responsive device for causing said recording instrument to be set in operation in response to signals received from said moving craft, time delay means controlled by said electro-responsive device for maintaining said recording instrument in operation for a predetermined period of time after said electro-responsive device has released, underwater receiving means adapted to generate an electrical signal in response to the impact of the planted mine against the bed of said body of water, a signal filter operatively connected to said underwater receiving means, a signal amplifier having the input thereof connected to said signal filter, and a second recording element on said recording instrument operatively connected to the output of said signal amplifier and adapted to be actuated variably by signals received from the signal amplifier thereby to record a signal corresponding to the impact of the mine against the bed of the body of water in timed relation with respect to signals recorded by said first recording element of the recording instrument.

10. In a system for protecting a harbor comprising a plurality of buoys moored in a predetermined arrangement within the harbor, a pair of microphonic devices supported by each of the buoys in communication with the air and with the water respectively, an observation station having a plurality of recording devices therein respectively associated with each pair of microphonic devices, means including a plurality of submarine cables for establishing an electrical connection between each pair of microphonic devices and the associated recording device, means controlled by signals received by the microphonic devices in communication with the air for setting the associated recording device in operation to record signals received by the respective pair of microphonic devices, and means for bringing the recording devices to rest when a predetermined period of time has elapsed after the signals received by the associated microphonic devices in communication with the air have decreased in strength to a predetermined value.

11. A system for protecting a body of water comprising a plurality of buoyant devices moored in a predetermined position on the surface of the body of water, each of said buoyant devices having a plurality of pairs of directional microphones arranged thereon adapted to detect signals received from opposite directions respectively, one of the microphones of each of said pairs being in communication with the air and the others of the microphones being in communication with the water, a source of electrical power, recording means associated with each pair of microphones, means controlled by a signal received from a craft moving within the field of detection of one of the microphones in comunication with the air for causing the associated recording means to be set in operation by said source of power thereby to record signals corresponding respectively to the movement of said craft and the planting of a mine within the field of detection of the associated pair of microphones, and means controlled by signals received from said craft by the microphone within the air for causing the recording means to be brought to rest when a predetermined period of time has elapsed after the craft has passed beyond the field of detection of the microphone within the air.

12. In a system of the character disclosed for recording information concerning a submarine mine planted within a body of water, the combination of a plurality of moored floats arranged in a predetermined pattern on the surface of said body of water, a plurality of means on each of said floats for detecting signals corresponding to the impact of the mine against the surface of the water within the vicinity of the floats as the mine is launched and for detecting the impact of the mine against the bed of the body of water respectively, a plurality of means respectively supported by each of the floats for recording in timed relation the signals received by each of said detecting means thereon, and means for rendering operative the means for recording the signal received by the means for detecting the impact of the mine against the bed of the body of water only after a signal has been received by the means for detecting the impact of the mine against the surface of the water.

13. In a system of the character disclosed for recording information concerning mines planted within a body of water from a moving craft, a recording device, means responsive to signals received from the craft for causing the recording device to be set in operation to record said signals, means responsive to the impact of the mine against the water for causing a characteristic signal to be recorded by said recording device in timed relation with respect to the signals received from said craft, and means including a time delay device controlled by signals received from the craft for maintaining the recording device continuously in operation until a predetermined period of time has elapsed after the signals received from the craft have decreased in strength to a predetermined value.

14. In a system for detecting the presence of mines planted within a body of water from a moving craft, the combination of a microphonic device in communication with the air adapted to receive signals from the craft and a signal corresponding to the impact of the mine against the water, a second microphonic device in communication with the water adapted to receive a signal through the water corresponding to the impact of the mine against the surface of the water, signal amplifying means operatively connected to each of the microphonic devices, a recording instrument having a recording element operatively connected to said signal amplifying means adapted to be actuated variably in accordance with the strength of signals received from each of said microphonic devices, a movable chart associated with said recording element, normally inactive means adapted to cause said chart to be moved at a constant rate of speed whereby the distance of the planted mine from said microphonic devices is proportional to the displacement of the signals recorded on the chart by the recording element in response to signals received by each of said microphonic devices in succession, means controlled by the signals from the craft for operating the chart moving means until the signals received from the craft have decreased to a predetermined value, means adapted to record time information characters on said chart, means controlled by a first signal received from the craft for causing a time information character to be recorded by said recording means, means controlled by successive signals received from the craft for preventing additional recordation of time information characters by said time recording means while the signals are being received from the craft, and means effective when the signals received from the craft have been reduced in strength to a predetermined value for causing a different time information character to be recorded by said recording means.

CLIFFORD S. LIVERMORE.